US006774171B2

(12) United States Patent
Kassa et al.

(10) Patent No.: US 6,774,171 B2
(45) Date of Patent: Aug. 10, 2004

(54) MAGNETIC COMPOSITION

(75) Inventors: Abraham Kassa, Shelby Township, MI (US); Jeffrey R. Apfel, Shelby Township, MI (US)

(73) Assignee: L&L Products, Inc., Romeo, MI (US)

( * ) Notice: Subject to any disclaimer, the term of this patent is extended or adjusted under 35 U.S.C. 154(b) by 0 days.

(21) Appl. No.: 10/339,112

(22) Filed: Jan. 9, 2003

(65) Prior Publication Data

US 2003/0144409 A1 Jul. 31, 2003

Related U.S. Application Data

(60) Provisional application No. 60/351,950, filed on Jan. 25, 2002.

(51) Int. Cl.[7] .................................................. C08K 3/10

(52) U.S. Cl. ........................ 524/436; 524/515; 524/523

(58) Field of Search ................................ 524/436, 515, 524/523

(56) References Cited

U.S. PATENT DOCUMENTS

| | | | | | |
|---|---|---|---|---|---|
| 4,427,481 | A | | 1/1984 | Smith et al. | |
| 4,538,380 | A | | 9/1985 | Colliander | |
| 4,690,778 | A | * | 9/1987 | Narumiya et al. | 252/506 |
| 4,693,775 | A | | 9/1987 | Harrison et al. | |
| 4,724,243 | A | | 2/1988 | Harrison | |
| 4,749,434 | A | | 6/1988 | Harrison | |
| 4,769,166 | A | | 9/1988 | Harrison | |
| 4,898,630 | A | | 2/1990 | Kitoh et al. | |
| 4,922,596 | A | | 5/1990 | Wycech | |
| 4,923,902 | A | | 5/1990 | Wycech | |
| 4,978,562 | A | | 12/1990 | Wycech | |
| 4,995,545 | A | | 2/1991 | Wycech | |
| 5,124,186 | A | | 6/1992 | Wycech | |
| 5,266,133 | A | | 11/1993 | Hanley et al. | |
| 5,274,006 | A | | 12/1993 | Kagoshima et al. | |
| 5,358,397 | A | | 10/1994 | Ligon et al. | |
| 5,428,332 | A | * | 6/1995 | Srail et al. | 335/302 |
| 5,470,886 | A | | 11/1995 | Makhlouf et al. | |
| 5,475,039 | A | | 12/1995 | Butikofer | |
| 5,634,182 | A | * | 5/1997 | Asanae et al. | 399/267 |
| 5,648,401 | A | | 7/1997 | Czaplicki et al. | |
| 5,712,317 | A | | 1/1998 | Makhlouf et al. | |
| 5,783,272 | A | | 7/1998 | Wong | |
| 5,884,960 | A | | 3/1999 | Wycech | |
| 5,894,071 | A | | 4/1999 | Merz et al. | |
| 5,932,134 | A | * | 8/1999 | Christ et al. | 252/62.54 |
| 5,932,680 | A | | 8/1999 | Heider | |
| 5,948,508 | A | | 9/1999 | Pastore et al. | |
| 5,964,979 | A | | 10/1999 | George et al. | |
| 5,985,435 | A | | 11/1999 | Czaplicki et al. | |
| 5,994,422 | A | | 11/1999 | Born et al. | |
| 6,004,425 | A | | 12/1999 | Born et al. | |
| 6,030,701 | A | | 2/2000 | Johnson et al. | |
| 6,040,350 | A | | 3/2000 | Fukui | |
| 6,057,382 | A | | 5/2000 | Karim et al. | |
| 6,077,884 | A | | 6/2000 | Hess et al. | |
| 6,096,791 | A | | 8/2000 | Born et al. | |
| 6,103,341 | A | | 8/2000 | Barz et al. | |
| 6,103,784 | A | | 8/2000 | Hilborn et al. | |
| 6,131,897 | A | | 10/2000 | Barz et al. | |

(List continued on next page.)

FOREIGN PATENT DOCUMENTS

| | | |
|---|---|---|
| EP | 0 442 178 A1 | 8/1991 |
| JP | 63260112 | 10/1988 |
| JP | 4059820 | 2/1992 |
| WO | WO 95/33785 | 12/1995 |
| WO | WO 97/02967 | 1/1997 |
| WO | WO 97/12929 | 4/1997 |
| WO | WO 97/19124 | 5/1997 |
| WO | WO 98/52997 | 11/1998 |
| WO | WO 99/02578 | 1/1999 |
| WO | WO 00/12571 | 3/2000 |
| WO | WO 00/12595 | 3/2000 |
| WO | WO 00/13876 | 3/2000 |
| WO | WO 00/20483 | 4/2000 |
| WO | WO 00/37242 | 6/2000 |
| WO | WO 00/37554 | 6/2000 |
| WO | WO 00/39232 | 7/2000 |
| WO | WO 00/40629 | 7/2000 |
| WO | WO 00/52086 | 9/2000 |
| WO | WO 01/57130 | 8/2001 |
| WO | WO 01/88033 | 11/2001 |
| WO | WO 03/072677 | 9/2003 |
| WO | WO 03/078163 | 9/2003 |

OTHER PUBLICATIONS

"The Epoxy Book", A System Three Resins Publication, pp. 1–41, System Three Resins, Inc., Seattle, Washington.

"Epoxy Resins" , Second Edition Encyclopedia of Polymer Science and Engineering, vol. 6, pp. 322–382, 1985.

Copending Application Ser. No. 09/939,245 filed Aug. 24, 2001.

Copending Application Ser. No. 09/847,252 filed May 2, 2001.

Copending Application Ser. No. 09/858,939 filed May 16, 2001.

Copending Applicaiton Ser. No. 09/459,756 filed Dec. 10, 1999.

Copending Applcation Ser. No. 09/676,725 filed Sep. 29, 2000.

Copending Application Ser. No. 09/923,138 filed Aug. 6, 2001.

Copending Application Ser. No. 10/119,446 filed Apr. 10, 2002.

Copending Application Ser. No. 10/212,524 filed Aug. 5, 2002.

European Search Report dated Dec. 15, 2003 for Ser. No. EP 03 07 5236.

Kisel', L.O. et al., "Magnetic thermoplastic elastomer blends for medical applications", International Polymer Science and Technology, No. 5, 1999, pp. 1–3, vol. 26.

*Primary Examiner*—Helen L. Pezzuto

(74) *Attorney, Agent, or Firm*—Dobrusin & Thennisch PC

(57) ABSTRACT

A magnetic composition is disclosed. The composition includes a polymeric mixture and a magnetic material.

23 Claims, No Drawings

U.S. PATENT DOCUMENTS

| | | | | |
|---|---|---|---|---|
| 6,133,335 | A | | 10/2000 | Mahoney et al. |
| 6,136,398 | A | | 10/2000 | Willett et al. |
| 6,136,944 | A | | 10/2000 | Stewart et al. |
| 6,153,302 | A | | 11/2000 | Karim et al. |
| 6,162,504 | A | | 12/2000 | Hubert et al. |
| 6,174,932 | B1 | | 1/2001 | Pachl et al. |
| 6,218,442 | B1 | | 4/2001 | Hilborn et al. |
| 6,228,449 | B1 | | 5/2001 | Meyer |
| 6,232,433 | B1 | | 5/2001 | Narayan |
| 6,235,842 | B1 | | 5/2001 | Kuwano et al. |
| 6,263,635 | B1 | | 7/2001 | Czaplicki |
| 6,277,898 | B1 | | 8/2001 | Pachl et al. |
| 6,287,669 | B1 | | 9/2001 | George et al. |
| 6,296,298 | B1 | | 10/2001 | Barz |
| 6,303,672 | B1 | | 10/2001 | Papalos et al. |
| 6,311,452 | B1 | | 11/2001 | Barz et al. |
| 6,312,668 | B2 | | 11/2001 | Mitra et al. |
| 6,319,964 | B1 | | 11/2001 | Blank et al. |
| 6,348,513 | B1 | | 2/2002 | Hilborn et al. |
| 6,350,791 | B1 | | 2/2002 | Feichtmeier et al. |
| 6,376,564 | B1 | | 4/2002 | Harrison |
| 6,419,305 | B1 | | 7/2002 | Larsen |
| 6,429,244 | B1 | | 8/2002 | Rinka et al. |
| 6,432,475 | B1 | | 8/2002 | Yamamoto et al. |
| 6,437,055 | B1 | | 8/2002 | Moriarity et al. |
| 6,440,257 | B1 | | 8/2002 | Zhou et al. |
| 6,441,075 | B2 | | 8/2002 | Hirata et al. |
| 6,441,081 | B1 | | 8/2002 | Sadatoshi et al. |
| H2047 | H | | 9/2002 | Harrison et al. |
| 6,444,149 | B1 | | 9/2002 | Valentinsson |
| 6,444,713 | B1 | | 9/2002 | Pachl et al. |
| 6,448,338 | B1 | | 9/2002 | Born et al. |
| 6,451,221 | B1 | * | 9/2002 | Hart et al. ............... 252/62.54 |
| 6,451,231 | B1 | | 9/2002 | Harrison et al. |
| 6,451,876 | B1 | | 9/2002 | Koshy |
| 6,455,146 | B1 | | 9/2002 | Fitzgerald |
| 6,455,476 | B1 | | 9/2002 | Imai et al. |
| 6,467,834 | B1 | | 10/2002 | Barz et al. |
| 6,471,285 | B1 | | 10/2002 | Czaplicki et al. |
| 6,479,560 | B2 | | 11/2002 | Freitag et al. |
| 6,482,486 | B1 | | 11/2002 | Czaplicki et al. |
| 6,486,256 | B1 | | 11/2002 | Tarbutton et al. |
| 6,506,494 | B2 | | 1/2003 | Brandys et al. |
| 6,561,571 | B1 | | 5/2003 | Brennecke |
| 6,573,309 | B1 | | 6/2003 | Reitenbach et al. |
| 6,620,501 | B1 | | 9/2003 | Kassa et al. |
| 6,682,818 | B2 | | 1/2004 | Czaplicki et al. |
| 2002/0009582 | A1 | | 1/2002 | Golden |
| 2002/0120064 | A1 | | 8/2002 | Khandpur et al. |
| 2002/0123575 | A1 | | 9/2002 | Kato et al. |
| 2002/0136891 | A1 | | 9/2002 | Khandpur et al. |
| 2002/0137808 | A1 | | 9/2002 | Gehlsen et al. |
| 2003/0187129 | A1 | | 10/2003 | Bell et al. |

* cited by examiner

MAGNETIC COMPOSITION

CLAIM OF BENEFIT OF FILING DATE

The present application claims the benefit of the filing date of U.S. Provisional Application Serial No. 60/351,950 (filed Jan. 25, 2002), hereby incorporated by reference.

FIELD OF THE INVENTION

The present invention relates generally to an improved magnetic composition, and more particularly to an improved magnetic composition, which may be employed for sealing, baffling, vibrational and acoustical dampening, structural reinforcing, combinations thereof or the like.

BACKGROUND OF THE INVENTION

For many years, industry and particularly the transportation industry has been concerned with designing compositions that function to provide sealing, baffling, vibrational and acoustical dampening, structural reinforcement, combinations thereof or the like to articles of manufacture such as transportation vehicles (e.g., automotive vehicles). Additionally, it is typically desirable for these compositions to exhibit one or more properties that allow the compositions to be more functional, processible or the like. In the interest of continuing such innovation, the present invention provides an improved magnetic composition.

SUMMARY OF THE INVENTION

Accordingly, the present invention provides a magnetic composition. The composition is preferably comprised of a polymeric mixture, an additive and a magnetic material. The polymeric mixture may include one or more of a variety of different polymers such as thermoplastics, thermoset or thermosettable polymers, plastics, plastomers, elastomers combinations thereof or the like. The additive is preferably a functional agent such as a tackifier, a flexibility agent or the like. The magnetic material preferably includes one or more metallic components, which may be part of ceramic material.

DETAILED DESCRIPTION OF THE INVENTION

The present invention is directed to an improved magnetic composition that is preferably polymeric and more preferably polymeric elastomers, plastics or the like. As used herein, the term magnetic as it is used to modify composition is intended to mean that the composition includes one or more materials that are magnetizable (i.e., capable of being magnetized), are magnetized or a combination thereof. The composition may be foamed or unfoamed (thus, prepared with or without blowing agent). The composition may be useful as a sealant, an adhesive, or may be incorporated into a structural foam material or member. In one embodiment, the composition is provided on a rigid or flexible substrate (e.g., metal (foamed or unfoamed), plastic (foamed, unfoamed, thermoplastic (e.g., polyamide based), thermoset, or otherwise). The substrate is in the form of a baffle, a cavity reinforcement, or some other structural reinforcement, or insert adapted for reducing noise, vibration or harshness, particularly in an automotive vehicle. The composition may also be used by itself in the absence of a substrate. Examples of applications include those set forth, for example, in U.S. Pat. Nos. 6,296,298; 6,311,452; 6,131,897; 6,103,341; and 5,985,435 incorporated herein by reference for all purposes. In another application, the composition is adapted for extrusion, such as through a mini-applicator, of the type described in U.S. Pat. No. 5,358,397, incorporated herein by reference for all purposes.

The composition of the present invention preferably includes one or more of the following components:

1) a polymeric mixture;

2) an additive; and 3) a magnetic material.

Polymeric Mixture

The polymeric mixture of the present invention typically includes one or more polymeric materials, which may be provided as resins or otherwise. The polymeric materials of the polymeric mixture may include elastomers, plastomers, plastics, thermoplastics, thermoset or thermosettable polymers, combinations thereof or the like. It should be recognized that the polymer ingredients may be homopolymers, copolymers, blends or otherwise. The composition of the invention may include up to about 95% by weight polymeric mixture or more and a little as 5% by weight polymeric mixture or less. Preferably the composition includes between about 5% and about 85% by weight polymeric mixture, more preferably between about 10% and about 55% by weight polymeric mixture, still more preferably between about 25% and about 45% by weight polymeric mixture.

In preferred embodiments, the polymeric mixture of the present invention includes a substantial portion of thermoplastic. Preferred thermoplastic polymeric materials useful in the present invention are polyolefins, preferably copolymers and terpolymers containing ethylene, for example, ethylene vinyl acetate copolymers, ethylene ethyl acrylate, ethylene-vinyl acetate-glycidal methacrylate, ethylene acrylate-maleic anhydride, and ethylene-propylene copolymers. Also, certain block copolymers such as an styrene-butadiene block copolymers may be suitable. Copolymers and terpolymers containing polyvinyl chloride are also preferred for use herein. Preferred thermosetting polymeric mixtures for use in the present invention are epoxies, acrylates, polyurethanes and combinations thereof.

Typically, the polymeric mixture includes one or more ethylene-propylene rubbers or diene monomers (EPDM). Preferably, between about 7% and about 15% of the EPDM is relatively high in ethylene content and includes greater than about 40% by weight ethylene content, more preferably greater than about 55% by weight ethylene content, and still more preferably greater than about 70% by weight ethylene content. Moreover, the overall composition preferably includes up to or greater than about 18% by weight EPDM, more preferably between about 4% and 13% by weight EPDM and still more preferably between about 6% and about 11% by weight EPDM. Examples of preferred ethylene-propylene rubbers are sold under the tradename ROYALENE® 301-T and TRILENE® 67, both commercially available from the Crompton Corporation—Uniroyal Chemical, One American Lane, Greenwich, Conn., 06831-2559; and VISTALON® 7000, commercially available from Exxon Mobil Chemical, 13501 Katy Freeway, Houston, Tex., 77079-1398.

The polymeric mixture also typically includes one or more acrylic materials (e.g., acrylate copolymers), and preferably includes a copolymer of ethylene acrylate, butyl acrylate or a combination thereof. It is contemplated that the acrylate polymer is up to or greater than about 15% by weight of the composition, preferably between about 3% and about 12% by weight of the composition and still more preferably between about 5% and about 9% by weight of the composition. One exemplary preferred copolymer of ethylene and butyl acrylate is sold under the tradename LOTRYL® 35 BA 40, commercially available from Atofina Chemicals, Inc., 2000 Market Street, Philadelphia, Pa. 19103-3222.

In a highly preferred embodiment, the polymeric mixture includes one or more halogenated elastomers or rubbers, (e.g., a brominated, chlorinated or fluorinated elastomer). It is contemplated that the halogenated elastomer may be provided as a liquid or otherwise. Preferably, the composition includes up to or greater than about 15% by weight of a halogenated elastomer, more preferably between about 1% and about 10% by weight of a halogenated elastomer and still more preferably between about 2% and about 4% by weight of a halogenated elastomer. One exemplary suitable halogenated elastomer is a brominated elastomer that is derived from a copolymer of isobutylene and p-methylstyrene. Such an elastomer is sold under the tradename EXXPRO®, commercially available from Exxon Mobil Chemical, 13501 Katy Freeway, Houston, Tex., 77079-1398.

Additionally or alternatively, the polymeric mixture preferably includes one or more polybutenes, although not necessarily required. When included, the polybutenes are preferably present in an amount up to or greater than 30% by weight of the magnetic composition, more preferably between about 5% and about 25% by weight of the composition, even more preferably between about 10% and about 20% by weight of the composition and still more preferably between about 12% and about 16% by weight of the composition. One preferred exemplary polybutene is sold under the tradename INDOPOL H-1500, commercially available from Indopol Polybutenes, 150 West Warrenville Road, Mail Code CS-3, Naperville, Ill., 60563-8460.

It is also contemplated that the polymeric mixture may include one or more polymer sub-mixtures. Such sub-mixtures, when included, are preferably present in the composition in an amount up to or greater than 15% by weight of the magnetic composition, more preferably between about 1% and 10% by weight of the composition and even more preferably between about 2% and about 6% by weight of the composition. Preferably, such a sub-mixture includes an elastomer mixed (e.g., compounded, blended, reactecd or the like) with another polymer such as a plastic, a thermoplastic, another elastomer or the like. One highly preferred sub-mixture includes an elastomer or butylene based material such as polyisobutylene and a styrenic material such polymethylstyrene.

Magnetic Material

The magnetic material of the composition is preferably provided as particles and the particles may be provided in a variety of shapes and configurations. As an example, the particles may be provided as shavings, spheres, powders, combinations thereof or the like. The composition of the present invention may include up to about 70% by weight magnetic material or more and as little as 1.0% by weight magnetic material or less. Preferably, the composition includes between about 10% and about 60% by weight magnetic material, more preferably between about 20% and about 50% by weight magnetic material and even more preferably between about 30% and about 40% by weight magnetic material.

It is to be understood that virtually any magnetic particles can be used in the present invention. Preferred magnetic particles for use in the present invention are ferrites, such as barium ferrite and strontium ferrite. Also preferred are iron oxides. One particularly preferred type of magnetic particles for use in the present invention is sold under the tradename HM406 "Starmag" ceramic powder, commercially available from Hoosier Magnetics, Inc., 65 Main Street, Postsdam, N.Y. 13676. The particle size of the magnetic particles is preferably between about 0.1 and 100 microns in diameter and more preferably from about 1 to about 10 microns, with the average magnetized particle size being preferably from about 0.5 to 10 microns, e.g., about 2 to about 5 microns.

Reinforcement Materials

It is contemplated that the composition of the present invention may include one or more reinforcement materials for improving properties such as strength, stiffness, sag resistance, flow control or the like of the composition. While various reinforcement materials may be employed, preferred reinforcement materials are fiber materials, which may be dispersed within the composition. The magnetic composition of the present invention may include up to about 10% by weight reinforcement material or more and as little as 0.001% by weight reinforcement material or less. Preferably, the composition includes between about 3% and about 0.008% by weight reinforcement material, more preferably between about 0.7% and about 0.03% by weight reinforcement material and even more preferably between about 0.3% and about 0.07% by weight reinforcement material.

As an example, the compostion may include organic fibers, inorganic fibers, other fibers, combinations thereof or the like. Examples of such fibers include, without limitation, polyamide (e.g., nylon, aromatic polyamide and polyamideimide) fibers, aramid fibers, ceramic fibers, polyester fibers, glass fibers, silicon carbide fibers, alumina fibers, titanium fibers, steel fibers, carbon fibers and graphite fibers or the like. It is also contemplated that reinforcement fabrics such as weavings, rovings or the like may be integrated into the sheet molding compound and that such fabrics may be formed of the fibers discussed herein or other fibers as well.

Blowing Agent

If desired, the composition of the present invention may be activatable to expand, foam or both and may include one or more blowing agents for at least assisting the activation of the composition. The blowing agents may be pressure activated, heat activated, chemically activated, radiation activated or the like.

In a preferred embodiment, the blowing agent is heat activated. Exemplary heat-activated blowing agents may include one or more nitrogen containing groups such as amides, amines and the like. Examples of suitable blowing agents include azodicarbonamide, dinitrosopentamethylenetetramine, azodicarbonamide, dinitrosopentamethylenetetramine, $4,4_i$-oxy-bis (benzenesulphonylhydrazide), trihydrazinotriazine and $N,N_i$-dimethyl-$N,N_i$-dinitrosoterephthalamide.

An accelerator for the blowing agents may also be provided in the expandable material. Various accelerators may be used to increase the rate at which the blowing agents form gasses (e.g., inert gasses). One preferred blowing agent accelerator is a metal salt, or is an oxide, e.g. a metal oxide, such as zinc oxide. One exemplary preferred zinc oxide is a powder sold under the tradename ZOCO 100, commercially available from Zochem, Brampton, Ontario. Other preferred accelerators include modified and unmodified thiazoles or imidazoles.

Amounts of blowing agents and blowing agent accelerators can vary widely within the expandable material depending upon the type of cellular structure desired, the desired amount of expansion of the expandable material, the desired rate of expansion and the like. Exemplary ranges for the amounts of blowing agents and blowing agent accelerators in the expandable material range from about 0.0001% by weight to about 5% by weight for each component and are preferably in the composition in fractions of weight percentages.

Most preferred blowing agents produce a volumetric expansion of from about 25% to about 2000% by volume, and more preferably 700% to 1500%. The preferred blowing agent is fully activated at about 50 to about 200° C. A blowing agent promoter such as a surface-coated urea, for example BIK 0T (Naugatuck Chemicals) may also be included, e.g., in a concentration of from about 0.005 to about 1.0 percent by weight.

Curing Agents

The composition typically includes one or more curing (e.g., crosslinking, vulcanizing or the like) agents. Any suitable curing agent may be employed in the composition and the amount of curing agent may vary widely depending upon desired reaction rates. In one preferred embodiment, a cross-linking acrylic monomer is present in the composition in an amount between about 0.01% to about 3% by weight and more preferably in an amount between about 0.30% to about 1% by weight. One preferred acrylic monomer is a dipentaerythritol pentaacrylate sold under the alphanumeric designation SR-399, commercially available from Sartomer, 502 Thomas Jones Way, Exton, Pa. 19341. Exemplary alternative acrylic monomers include ditrimethylopropane tetraacrylate and ethoxylated petaerythritol tetraacrylate.

Additionally or alternatively, the composition may include a vulcanizing agent. When included, various vulcanizing agents may be utilized in amounts ranging from about 0.01% to about 4% by weight of the magnetic composition. One exemplary vulcanizing agent is a 1,1-bis(tert-butylperoxy)3,3,5-trimethylcyclohexane, which is prepared on an inert fill and is sold under the tradename Varox 231-XL, commercially available from the R. T. Vanderbilt Company, Inc., 30 Winfield Street, P.O. Box 5150, Norwalk, Conn. 06856-5150.

Fillers

The composition of the present invention may also include one or more fillers, including but not limited to particulated materials (e.g., powder), beads, microspheres, or the like. Preferably the filler includes a relatively low-density material that is generally non-reactive with the other components present in the composition.

Examples of fillers include silica, diatomaceous earth, glass, clay, talc, pigments, colorants, glass beads or bubbles, glass, carbon ceramic fibers, antioxidants, and the like. Such fillers, particularly clays, can assist the expandable material in leveling itself during flow of the material. The clays that may be used as fillers may include clays from the kaolinite, illite, chloritem, smecitite or sepiolite groups, which may be calcined. Examples of suitable fillers include, without limitation, talc, vermiculite, pyrophyllite, sauconite, saponite, nontronite, montmorillonite or mixtures thereof. The clays may also include minor amounts of other ingredients such as carbonates, feldspars, micas and quartz. The fillers may also include ammonium chlorides such as dimethyl ammonium chloride and dimethyl benzyl ammonium chloride. Titanium dioxide might also be employed.

In one preferred embodiment, one or more mineral or stone type fillers such as calcium carbonate, sodium carbonate or the like may be used as fillers. In another preferred embodiment, silicate minerals such as mica may be used as fillers. It has been found that, in addition to performing the normal functions of a filler, silicate minerals and mica in particular.

When employed, the fillers in the composition can range from 10% to 90% by weight of the composition. According to some embodiments, the composition may include from about 0% to about 3% by weight, and more preferably slightly less that 1% by weight clays or similar fillers. Powdered (e.g. about 0.01 to about 50, and more preferably about 1 to 25 micron mean particle diameter) mineral type filler can comprise between about 5% and 70% by weight, more preferably about 10% to about 20%, and still more preferably approximately 13% by weight of the composition.

Additives

The composition typically includes one or more additives (e.g., functional additives) for improving one or more various properties of the composition. As examples, additives may include antioxidants, antiozonants, ultraviolet absorbers, antistatic agents, colorants, coupling agents, curing agents, flame retardants, blowing agents, heat stabilizers, impact modifiers, lubricants, plasticizers, preservatives, processing aids and stabilizers and combinations thereof or the like.

One additive, which may be provided in the composition is an adhesive or tackifier (e.g., a tackifying polymeric mixture), which may be added to the composition for enhancing adhesion, peel strength or both. Preferably, the tackifier is a hydrocarbon based tackifier and more preferably is an aromatically modified C5 or C5:C9 hydrocarbon tackifying polymeric mixture. When included, the tackifying polymeric mixture is up to or greater than about 15% by weight of the composition, preferably about 2% to about 12% by weight of the composition and still more preferably between about 5% and about 9% by weight of the composition. One preferred exemplary tackifier is sold under the tradename WINGTACK™, commercially available from Goodyear Chemical, Akron, Ohio.

Another potential additive for the composition is oil (e.g., paraffinic oil). When included, the composition preferably includes between about 2% and about 30% by weight oil, more preferably between about 5% and about 15% by weight oil and most preferably between about 7% and about 11% by weight oil. One particularly preferred paraffinic oil is sold under the tradename SUNPAR 2280, commercially available from Sunoco, Inc., Philadelphia, Pa.

It is also contemplated that the magnetic composition may include one or more anti-corrosion agents. Preferably, the magnetic composition includes between up to or greater than about 15% by weight anti-corrosion agent, more preferably between about 2% and about 10% by weight anti-corrosion agent and still more preferably between about 4% and about 6% by weight anti-corrosion agent. One particular preferred anti-corrosion agent is a coumarone-indene polymeric mixture sold under the tradename CUMAR® R-13, commercially available from the Neville Chemical Company, Pittsburgh, Pa.

The magnetic composition of the present invention may be prepared according to any suitable technique. Preferably, the composition is prepared using conventional batch processing techniques, which will be familiar to those skilled in the art. Briefly, the raw materials are added to a mixer and mixed until fully blended. A planar sheet, strip, tape or other structure is then preferably formed, such as by extruding the magnetic composition into the form of a sheet which may then be die cut to a specific shape. Such sheet might have a thickness of from about 0.1 mm to about 5.0 mm. Larger or smaller thicknesses are also possible. It may also be possible to form a liquid coating composition that employs the present composition.

The magnetic materials are magnetized in any suitable manner. A number of magnetizers are available for this purpose. Most preferred is a capacitive discharge magnetizer, which provides large magnetic field densities. Although capacitive discharge is a discontinuous process, by properly spacing the discharge intervals, a sheet can be fully magnetized as it moves along a conveyor to magnetize the magnetic material of the magnetic composition. Permanent magnetic magnetizers may also be used effectively. Desirably, a magnetic field density of at least about 25 gauss and more preferably at least 50 gauss is generated by the composition.

The magnetic composition may be applied in nearly any shape to nearly any surface of any substrate. In a preferred application, the composition is contacted with a metal component (e.g., a frame or body component) of an article of manufacture (e.g., an automotive vehicle).

Advantageously, it has been found that the magnetic composition of the present invention is effective for attaching (e.g., adhering and/or magnetizing) itself to components and particularly metal components. As an example, a magnetized composition according to the present invention can be formulated to attach to a metal (e.g., steel) component such that the composition exhibits a peel strength (e.g., at 90°) of up to or greater than 45 grams per millimeter and more preferably up to or greater than 50 grams per millimeter. Of course, a magnetized composition according to the present invention is not required to exhibit such strength.

The preferred embodiment of the present invention has been disclosed. A person of ordinary skill in the art would realize however, that certain modifications would come within the teachings of this invention. Therefore, the following claims should be studied to determine the true scope and content of the invention.

What is claimed is:

1. A magnetic composition, comprising:

a polymeric mixture, the polymeric mixture including;

i) ethyle-propylene rubber; and ii) acrylic polymer;

an additive, which is selected from the group of a tackifier or a flexibility agent; and a magnetic material, the magnetic material being at least partially formed of a ceramic;

wherein between about 7% and about 15% of the ethylene-propylene rubber is greater than about 55% by weight ethylene content and wherein the composition exhibits a peel strength at 90° of greater than 45 grams per millimeter upon attachment to a metal component.

2. A magnetic composition as in claim 1 wherein the polymeric mixture includes a brominated elastomer that is derived from a copolymer of isobutylene and p-methylstyrene.

3. A magnetic composition as in claim 1 wherein the between about 7% and about 15% of the ethylene-propylene rubber is greater than about 70% by weight ethylene content.

4. A magnetic composition as in claim 1 wherein the polymeric mixture includes polyisobutylene and polymethylstyrene.

5. A magnetic composition as in claim 1 wherein the magnetic material is a ferrite.

6. A magnetic composition as in claim 1 further comprising a blowing agent, a blowing agent accelerator and a curing agent.

7. A magnetic composition, comprising:

a polymeric mixture, the polymeric mixture including;

i) ethylene-propylene rubber;

ii) acrylic copolymer;

iii) halogenated elastomer;

iv) polyisobutylene; and v) polymethylstyrene;

tackifying agent, the tackifying agent being a hydrocarbon; and a magnetic material, the magnetic material being at least partially formed of a ceramic and including a ferrite.

8. A magnetic composition as in claim 7 wherein the composition exhibits a peel strength at 90° of greater than 45 grams per millimeter upon attachment to a metal component.

9. A magnetic composition as in claim 7 wherein the halogenated elastomer is a brominated elastomer that is derived from a copolymer of isobutylene an p-methylstyrene.

10. A magnetic composition as in claim 7 wherein between about 7% and about 15% of the ethylene-propylene rubber is greater than about 55% by weight ethylene content.

11. A magnetic composition as in claim 10 wherein the between about 7% and about 15% the ethylene-propylene rubber is greater than about 70% by weight ethylene content.

12. A magnetic composition as in claim 7 further comprising a blowing agent, a blowing agent accelerator and a curing agent.

13. A magnetic composition, comprising:

a polymeric mixture, the polymeric mixture including;

i) ethylene-propylene rubber present in an amount between about 3% and about 10% by weight of the composition; and ii) acrylic copolymer;

iii) halogenated elastomer;

iv) polybutene; and v) a sub-mixture of elastomer and styrenic material a tackifying agent, the tackifying agent being an aromatically modified C5 hydrocarbon tackifying resin;

a paraffinic oil;

a coumarone-indene resin;

a blowing agent, the blowing agent present in an amount between 0% and about 5% by weight of the composition;

a curing agent, the curing agent present in an amount between about 0.01% and about 3% by weight of the composition reinforcement material, the reinforcement material being at least partially formed of polyamide fibers, the reinforcement material present in an amount between about 0.00% and about 3% by weight of the composition; and a magnetic material present in an amount between about 10% and about 60% by weight of the composition, the magnetic material being at least partially formed of a ceramic the magnetic material at least partially selected from the group of barium ferrite, strontium ferrite or combinations thereof.

14. A magnetic composition as in claim 1 wherein the additive is a tackifier and the tackifier is hydrocarbon.

15. A magnetic composition as in claim 4 wherein the additive is a tackifier and the tackifier is a hydrocarbon.

16. A magnetic composition as in claim 1 further comprising an anti-corrosion agent.

17. A magnetic composition as in claim 16 wherein the anti-corrosion agent is a coumarone-indene resin.

18. A magnetic composition as in claim 7 further comprising an anti-corrosion agent.

19. A magnetic composition as in claim 18 wherein the anti-corrosion agent is a coumarone-indene resin.

20. A magnetic composition as in claim 1 further comprising a reinforcement material.

21. A magnetic composition as in claim 7 further comprising a reinforcement material.

22. A magnetic composition as in claim 7 further comprising a paraffinic oil.

23. A magnetic composition as in claim 7 further comprising a paraffinic oil.

* * * * *

UNITED STATES PATENT AND TRADEMARK OFFICE

CERTIFICATE OF CORRECTION

PATENT NO. : 6,774,171 B2
DATED : August 10, 2004
INVENTOR(S) : Abraham Kassa and Jeffrey R. Apfel It is certified that error appears in the above-identified patent and that said Letters Patent is hereby corrected as shown below:

Column 7,
Line 39, replace "polymer" with -- copolymer --.

Column 8,
Line 51, replace "0.00%" with -- 0.008% --.

Signed and Sealed this

Seventh Day of December, 2004

JON W. DUDAS
*Director of the United States Patent and Trademark Office*